United States Patent [19]

Marxer et al.

[11] Patent Number: 4,553,137

[45] Date of Patent: Nov. 12, 1985

[54] NON-INTRUSIVE ICE DETECTOR

[75] Inventors: John E. Marxer, Apple Valley; John W. Kowles, Minneapolis, both of Minn.

[73] Assignee: Rosemount Inc., Eden Prairie, Minn.

[21] Appl. No.: 499,819

[22] Filed: Jun. 1, 1983

[51] Int. Cl.⁴ .............................................. G08B 19/02
[52] U.S. Cl. .................................. 340/582; 340/962; 244/134 F
[58] Field of Search ............... 340/582, 581, 583, 580, 340/962; 73/599, 590, 583; 244/134 R, 134 A, 134 D, 134 E, 134 F

[56] References Cited

U.S. PATENT DOCUMENTS

| | | | |
|---|---|---|---|
| 2,359,787 | 10/1944 | Peters et al. | 219/502 |
| 2,414,756 | 1/1947 | May | 177/311 |
| 2,800,647 | 7/1957 | Baerwald et al. | 340/582 |
| 3,341,835 | 9/1967 | Werner et al. | 340/582 |
| 4,461,178 | 7/1984 | Chamuel | 340/582 X |

FOREIGN PATENT DOCUMENTS

| | | | |
|---|---|---|---|
| 506843 | 6/1939 | United Kingdom . | |
| 626543 | 7/1949 | United Kingdom . | |
| 2124764 | 7/1983 | United Kingdom | 244/134 R |

Primary Examiner—James L. Rowland
Assistant Examiner—Jeffery A. Hofsass
Attorney, Agent, or Firm—Kinney & Lange

[57] ABSTRACT

An improved ice detector has a vibrating element which has a front portion and vibrating means suitably disposed with respect to the vibrating element for exciting the vibrating element into vibration and means for sensing a shift of the frequency of vibration of the vibrating element resulting from a change of mass of the vibrating element due to ice accumulating thereon. The improvement is characterized in that the ice detector is supported with respect to a surface exposed to an air stream such that a cap on which ice forms and which is disposed on the front portion of the vibrating element, is exposed to the air stream and is formed to be substantially conformal to such surface.

19 Claims, 2 Drawing Figures

NON-INTRUSIVE ICE DETECTOR

BACKGROUND OF THE INVENTION

1. Field of the Invention

The present invention relates generally to a detector for sensing the formation of ice. Specifically it is an ice detector wherein the portion on which the ice forms is conformal with the surface in which it is disposed.

2. Description of the Prior Art

Ice detectors have been widely used on air vehicles, comprising aircraft, missiles, ground supported antennae and other devices in an air stream. Heretofore, they have generally comprised intrusive probes, that is probes which project into the air stream. Such probes generally cause undesirable magnitudes of aerodynamic drag and radar cross-section or reflectivity.

Accordingly, an advantage of the present invention is to facilitate detection of ice formation with a device that is conformal with the surface in which it is disposed such that reduction in aerodynamic drag and radar reflectivity is realized.

SUMMARY OF THE INVENTION

An improved ice detector has a vibrating element which has a front portion and a vibrating means suitably disposed with respect to the vibrating element for exciting the vibrating element into vibration and means for sensing a shift of the frequency of vibration of the vibrating element resulting from a change of mass of the vibrating element due to ice accumulating thereon. The improvement is characterized in that the ice detector is supported with respect to a surface exposed to an air stream such that a cap, on which ice forms and which is disposed on the front portion of the vibrating element, is exposed to the air stream and is formed to be substantially conformal to such surface while still providing for adequate vibration in a condition when ice is not formed on such cap.

In one embodiment, the cap is formed of a substantially non-compliant material and is rigidly affixed to the front portion of the vibrating element.

In another preferred embodiment, the ice detector is disposed such that it is non-intrusive to the airstream.

DESCRIPTION OF THE PREFERRED EMBODIMENTS

Figure 1:
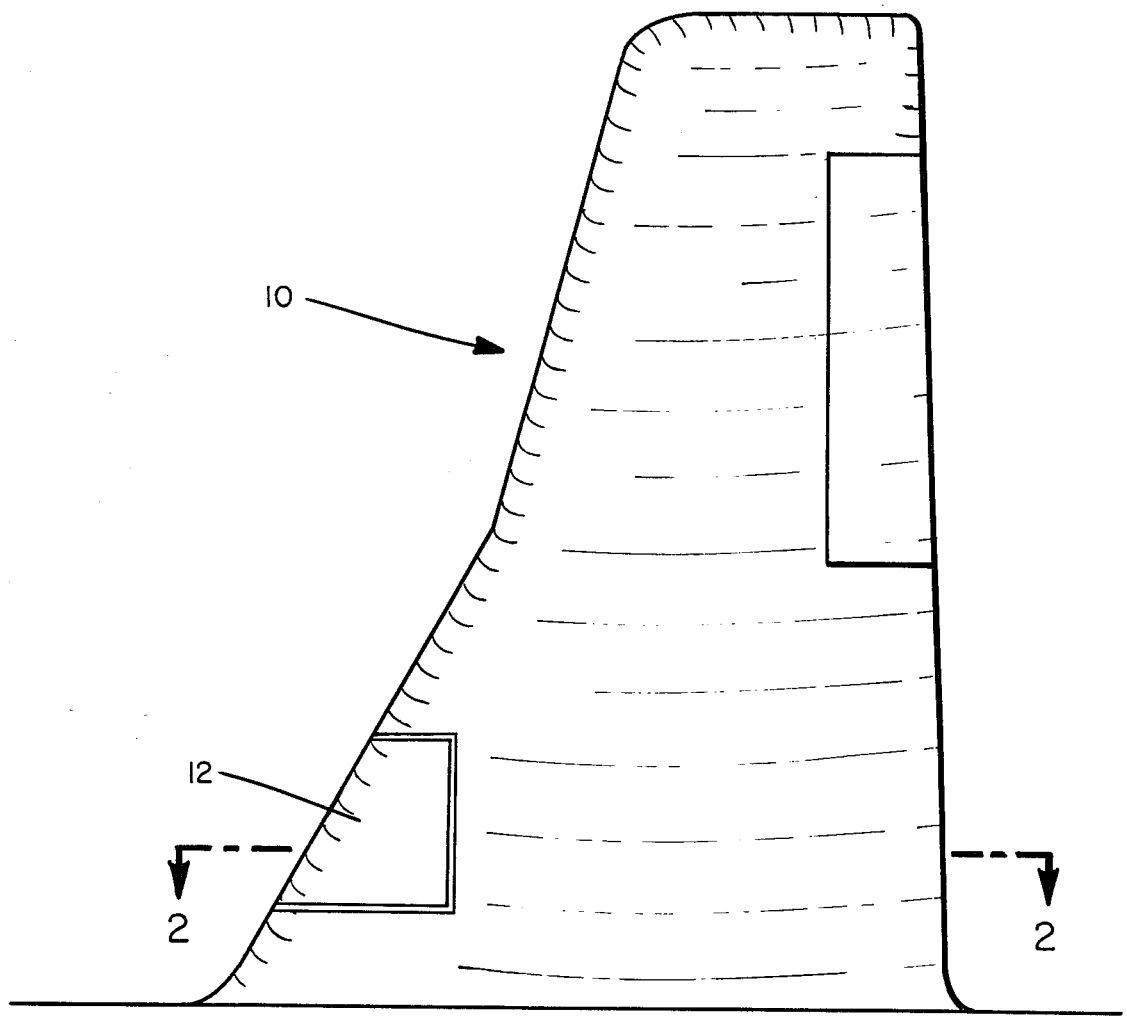
FIG. 1 is a side view of the cap, which is on the front portion of the vibrating element disposed in the vertical stabilizer tail of an air vehicle.
Figure 2:
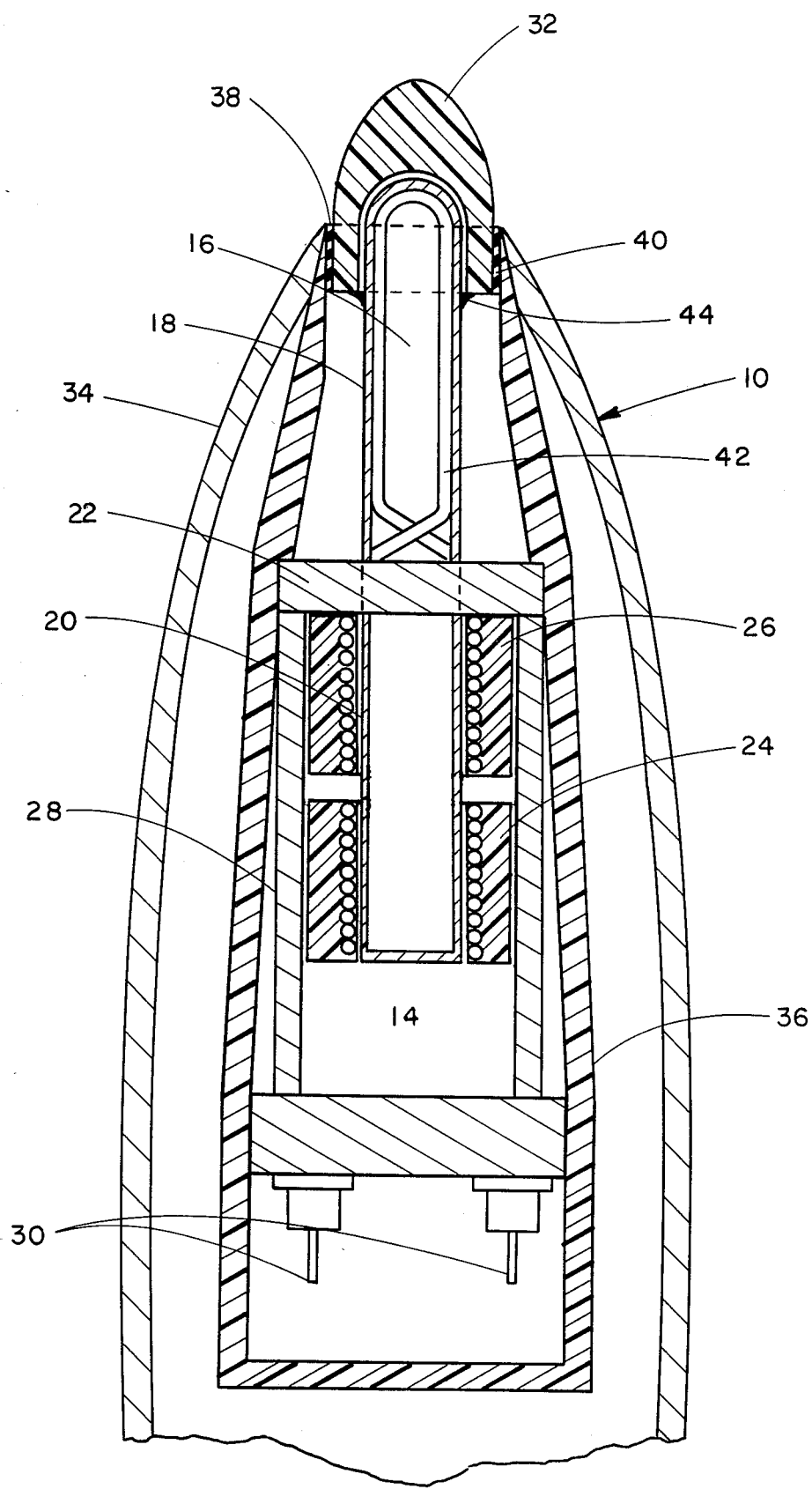
FIG. 2 is a section of the ice detector and vertical stabilizer tail structure of the device shown in FIG. 1 taken horizontally at the point midway along lines 2—2. Dimension of the cap.

FIGS. 1 and 2 show component 10 of an air vehicle. The air vehicle can be any airborne device on which it is desirable to sense the formation of ice. The air vehicle can be powered or unpowered, guided or unguided, piloted or unpiloted. It is understood that component 10 could be a nosecone, wing, tail, empenage, fuselage, fin, strake, pylon, engine inlet, cowling or other component of the air vehicle. In the preferred embodiments shown, air vehicle component 10 is the vertical stabilizer of a relatively small air vehicle, such as a missle.

In the embodiment shown in FIG. 1, cap 12 is exaggerated in size with respect to air vehicle component 10 for ease of understanding. It is understood that in a preferred embodiment, the vertical dimension of the cap is approximately 0.93 cm whereas the vertical dimension of the tail in which it is installed may be several meters. FIG. 1 shows that cap 12 is conformal with the surface of air vehicle component 10 and is substantially non-intrusive with respect to the air stream.

Detailed operation of an ice detector, such as ice detector 14 of FIG. 2 is explained in U.S. Pat. No. 3,341,385, held by the same assignee, which is incorporated herein by reference but it is understood that other vibrating ice detectors may be used with this invention. In the embodiment of FIG. 2 ice detector 14 is disposed in air vehicle component 10. Vibrating element 16 is comprised of a front portion 18 and a rear portion 20, generally of equal length. Vibrating element 16 is supported by nodal support 22 at a node of vibration when vibrating element 16 is vibrated at its resonant frequency. In this embodiment, an electric drive coil 24 and feedback coil 26 are shown. Such coils surround rear portion 20 of vibrating element 16. Bridging these coils is tube 28 with an attached permanent magnet. An electromagnet may also be used. An oscillator powers drive coil 24 which in turn vibrates vibrating element 16 at its resonant frequency. Feedback coil 26 senses the frequency of oscillation of vibrating element 16. Electrical power and output signals are provided through terminals 30. Vibrating element 16 is driven magnetostrictively with drive coil 24 placed around it. Magnetostrictive materials, such as nickel, lengthen and shorten under conditions of magnetic bias. In this way, vibrating element 16 actually vibrates axially, becoming infinitesimally longer and shorter. Voltage is induced in feedback coil 26 placed around vibrating element 16 by the reverse process. Feedback coil 26 drives an amplifier which in turn supplies the drive coil signal, making it a closed loop system.

The system will operate at the mechanical resonant frequency of vibrating element 16. The actual motion of the probe cannot be seen or felt since the length change is on the order of several micro-meters and the drive power level is in the milliwatt region.

When ice becomes bonded to a cap 32, which in FIG. 1 is shown as cap 12, it changes the natural resonant frequency of vibrating element 16 due to mass loading. This frequency change is sensed to indicate the presence of ice. Contaminants, such as grease, oil, insects, etc. causes negligible frequency change since they do not bond rigidly to cap 32.

A stable crystal oscillator is used as a reference and its frequency is compared with vibrating element 16 frequency. This difference frequency is converted to a DC voltage. Whenever this DC voltage reaches a pre-set level, an icing output signal is generated and will last as long as the ice is present on cap 32.

Cap 32 is disposed on front portion 18 of vibrating element 16. It is understood that in addition to being utilized with the ice detector of U.S. Pat. No. 3,341,835, cap 32 may be utlized with other vibrating element ice detectors. In the embodiment of FIG. 2, vibrating element 16 is approximately 0.63 cm in diameter and cap 32 is approximately 0.95 cm in diameter. In a further embodiment, cap 32 is formed from substantially non-compliant material and is rigidly affixed to front portion 18 such that vibrations of front portion 18 are transmitted to cap 32. Cap 32 is exposed to the air stream. During icing conditions, ice forms on cap 32. In effect the mass of vibrating element 16 and cap 32 is increased by the mass of the ice formed on cap 32. This increase in mass changes the resonant frequency of vibrating element 16. Such change in frequency is sensed by feedback coil 26 and forms the basis of an output signal that indicates the formation of ice.

In a preferred embodiment cap 32 is conformal with exterior surface 34 of air vehicle component 10 in which ice detector 14 is disposed. Such conformance has a number of advantages. It is known that the aerodynamics of a surface affect the formation of ice thereon. Accordingly, to accurately reflect icing conditions on surface 34, the aerodynamics of cap 32 should closely approximate the aerodynamics of surface 34, hence, the aerodynamic conformance of cap 32 to the aerodynamic shape of component 10, results in an enhanced representation of the icing conditions on component 10; and, further the growth of ice on the leading edge of component 10 and cap 32 provides the earliest indication of icing conditions. Additionally, such conformance has the effect of reducing aerodynamic drag and radar reflectivity.

It has been demonstrated that cap 32 may be made of a metallic material. In such embodiment it is affixed at bonding 44 to vibrating element 16 by brazing or welding in order to ensure rigidity. In another embodiment, cap 32 is made of a non-metallic material such as polycarbonate material, boron epoxy composite material, glass reinforced plastic laminate material or other plastic material. Cap 32 is affixed at bonding 44 to vibrating element 16 by an adhesive such as epoxy that will ensure a rigid mating of the two pieces.

There are several advantages to utilizing a non-metallic material for cap 32. The first is that such materials are generally less dense than metallic materials and therefore, for similarly sized caps, a cap of non-metallic material will add less mass to vibrating element 16 than a cap of metallic material. It is desirable to keep the mass of vibrating element 16 as low as possible to minimize the effects of such mass on the resonant frequency of vibration. When cap 32 is added to an existent vibrating ice detector, certain known adjustments to the resonant frequency drive and the icing detection signals are made. Additionally, where it is desirable to reduce radar reflectivity, it is known that such materials have reduced radar reflectivity characteristics when compared to metallic materials.

Case 36 forms the outer enclosure of ice detector 14. Aperture 38 in case 36 is spaced apart from but substantially surrounds cap 32. It is desired that cap 32 be free to vibrate but that ice detector be sealed from water in the air stream. Accordingly, isolation material 40 is interposed between cap 32 and aperture 38. Isolation material 40 functions to seal case 36 at cap 32 without substantially dampening the vibration of cap 32. As previously explained, ice detector 14 is a mass loading device. It has been shown in testing to be much more sensitive to the effects of mass loading when compared to the effects of dampening. Additionally, vibration of vibrating element 16 is axial as opposed to side to side motion. Accordingly, the important characteristic of isolation material 40 is its shear characteristic as opposed to its tension and compressibility characteristics. The vibrational displacement is shown by theoretical analysis to be approximately ten nanometers. The device to measure such minute displacement is not known. Such minute displacement minimizes the amount of flexibility required in isolation material 40. The foregoing makes it desirable for isolation material 40 to form a flexible elastomeric bond having very low shear forces. It has been found that a room temperature vulcanizing (RTV) material such as silicon is suitable for isolation material 40. In another embodiment a rubber O-ring or gasket is utilized. Such material remains functional from −55 degrees C. to 70 degrees C., which comprises the operational range of temperatures over which isolation material 40 is expected to function.

To ensure a conformal juncture of surface 34 of air vehicle component 10 and cap 32, case 36 is supported by surface 34 proximate to aperture 38. It should be noted that while surface 34 and cap 32 are very close to each other, they are actually spaced apart so that surface 34 does not affect the vibrations of cap 32.

Where desired, vibrating element 16 is heated to perform a de-ice function. In the embodiment shown in FIG. 2, heater 42 is disposed internal to vibrating element 16. Where the de-ice function is desired cap 32 and bonding 44 have adequate thermal transmissibility properties such that heat generated by heater 42 is transmitted through bonding 44 to heat and de-ice cap 32.

What is claimed is:

1. An improved ice detector comprising a vibrating element, said vibrating element having a front portion, vibrating means suitably disposed with respect to the vibrating element for exciting the vibrating element into vibration, and means for sensing a shift of the frequency of vibration of said vibrating element resulting from a change of mass of said vibrating element due to ice accumulating thereon, the improvement characterized for the ice detector with respect to a first surface exposed to an air stream, said ice detector having cap means supported on the front portion of the vibrating element for vibrating with said vibrating element, said cap means being independently vibratable with respect to the first surface and having an exterior surface exposed for ice formation thereon and formed to be substantially conformal to such first surface, and the cap means exterior surface being the only portion of the vibrating element exposed to the air stream.

2. An improved ice detector according to claim 1 for an air vehicle or a housing having a surface exposed to air stream further characterized in that the cap means is formed of a substantial non-compliant material rigidly affixed to the front portion of the vibrating element.

3. An improved ice detector according to claim 2 further characterized in that the ice detector is disposed such that it is substantially non-intrusive to the air stream with respect to such surface.

4. An improved ice detector as claimed in claim 3 further characterized in that the vibrating element has a heater disposed in a heat conductive relationship with the front portion thereof, the cap means having thermal conductivity properties such that heat is conducted from the heater to de-ice the cap means.

5. An improved ice detector as claimed in claim 3 further characterized in that the ice detector is enclosed in a case, the case having an aperture, the cap means projecting therethrough, isolation means disposed between the aperture and the cap means for substantially water sealing the case and substantially vibrationally isolating the cap means from the case.

6. An improved ice detector according to claim 3 further characterized in that the cap means is formed from a material selected from the group consisting of polycarbonate, boron epoxy composite and glass fiber reinforced plastic laminate materials.

7. An improved ice detector according to claim 3 further characterized in that the cap means is formed from a metal material.

8. An improved ice detector comprising a nodal support forming a dividing surface, a vibrating element having a node of vibration when it is resonately vibrated, the nodal support being attached to said vibrating element substantially at said node of vibration and forming at least substantially the entire support of said vibrating element, said vibrating element having rear and front portions, each portion extending away from said nodal support, said element being capable of being located by said support with at least a part of the front portion positioned in a zone where ice may accumulate thereon, vibrating means mounted adjacent the rear portion for exciting the vibrating element into resonant vibration, and means for sensing a shift of the resonant frequency of vibration of said vibrating element resulting from a change of mass of said vibrating element due to ice accumulating thereon the improvement characterized in that the ice detector is supported with respect to a surface exposed to an air stream and has cap means for ice formation thereon disposed on the front portion of the vibrating element, said cap means being exposed to the air stream and formed to be substantially conformal to such surface.

9. An improved ice detector according to claim 8 for an air vehicle or a housing having a surface exposed to air stream further characterized in that the cap means is formed of a substantial non-compliant material rigidly affixed to the front portion of the vibrating element.

10. An improved ice detector according to claim 9 further characterized in that the ice detector is disposed such that it is substantially non-intrusive to the air stream with respect to such surface.

11. An improved ice detector as claimed in claim 10 further characterized in that the vibrating element has a heater disposed in a heat conductive relationship with the front portion thereof, the cap means having thermal conductivity properties such that heat is conducted from the heater to de-ice the cap means.

12. An improved ice detector as claimed in claim 10 further characterized in that the ice detector is enclosed in a case, the case having an aperture, the cap means projecting therethrough, isolation means disposed between the aperture and the cap means for substantially water sealing the case and substantially vibrationally isolating the cap means from the case.

13. An improved ice detector according to claim 12 further characterized in that the isolation means is comprised of a material forming flexible elastomeric bond between the cap means and the case which bond is characterized by very low shear force.

14. An improved ice detector according to claim 13 further characterized in that the isolation means is comprised of a room temperature vulcanizing material.

15. An improved ice detector according to claim 10 further characterized in that the cap means is formed from a material selected from the group consisting of polycarbonate, boron epoxy composite and glass fiber reinforced plastic laminate material.

16. An improved ice detector according to claim 10 further characterized in that the cap means is formed from a metal material.

17. In an ice detector comprising a vibrating element, said vibrating element having a front portion, vibrating means suitably disposed with respect to the vibrating element for exciting the vibrating element into vibration, and means for sensing a shift of the frequency of vibration of said vibrating element resulting from a change of mass of said vibrating element due to accumulating thereon, the improvement comprising a case enclosing and supporting the ice detector, an aperture in said case, cap means rigidly affixed to the front portion of the vibrating element, said cap means being exposed to the air stream through said aperture and formed to be substantially conformal to such surface, the cap means being made of substantially non-compliant material and disposed to be substantially non-intrusive to the air stream with respect to such surface, and isolation means disposed between the aperture and the cap means for substantially water sealing the case interior and substantially vibrationally isolating the cap means from the case.

18. An improved ice detector according to claim 17 further characterized in that the the isolation means is comprised of a material forming a flexible elastomeric bond between the cap means and the case, which bond is characterized by very low shear force.

19. An improved ice detector according to claim 18 further characterized in that the the isolation means is comprised of a room temperature vulcanizing material.

* * * * *